US011498475B2

United States Patent
Aulbach et al.

(10) Patent No.: US 11,498,475 B2
(45) Date of Patent: Nov. 15, 2022

(54) MOTOR VEHICLE HAVING A PROJECTION DEVICE

(71) Applicant: Bayerische Motoren Werke Aktiengesellschaft, Munich (DE)

(72) Inventors: Johannes Aulbach, Reichertshausen Grafing (DE); Marina Budanow, Munich (DE); Thomas Hausmann, Vaterstetten (DE); Stefan Weber, Stadtbergen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/276,021

(22) PCT Filed: Aug. 27, 2019

(86) PCT No.: PCT/EP2019/072825
§ 371 (c)(1),
(2) Date: Mar. 12, 2021

(87) PCT Pub. No.: WO2020/064243
PCT Pub. Date: Apr. 2, 2020

(65) Prior Publication Data
US 2022/0063480 A1    Mar. 3, 2022

(30) Foreign Application Priority Data
Sep. 24, 2018    (DE) .................... 10 2018 216 254.9

(51) Int. Cl.
*B60Q 1/02*    (2006.01)
*B60Q 1/50*    (2006.01)

(52) U.S. Cl.
CPC .............. *B60Q 1/02* (2013.01); *B60Q 1/525* (2013.01); *B60Q 2400/50* (2013.01)

(58) Field of Classification Search
CPC ....... B60Q 1/02; B60Q 1/525; B60Q 2400/50
See application file for complete search history.

(56) References Cited

U.S. PATENT DOCUMENTS

| 5,568,137 A | * | 10/1996 | Liu | ...................... G05D 1/0234 |
| | | | | 250/397 |
| 6,709,141 B1 | * | 3/2004 | Sisti | ........................ B60Q 1/12 |
| | | | | 362/543 |

(Continued)

FOREIGN PATENT DOCUMENTS

| DE | 10 2006 048 503 A1 | 4/2008 |
| DE | 10 2011 078 288 A1 | 1/2013 |

(Continued)

OTHER PUBLICATIONS

International Search Report (PCT/ISA/210) issued in PCT Application No. PCT/EP2019/072825 dated Dec. 2, 2019 with English translation (six (6) pages).

(Continued)

*Primary Examiner* — Hoi C Lau
(74) *Attorney, Agent, or Firm* — Crowell & Moring LLP

(57) ABSTRACT

A motor vehicle includes a projection device to project a light distribution for driver information in the longitudinal direction of the motor vehicle onto the ground in front of the motor vehicle. The light function of the projected light distribution is different from a low beam and a high beam light. During operation of the projection device within a predefined interval of the vehicle speed in the forward direction of the motor vehicle, an increase in the extent of the light distribution in the longitudinal direction of the motor vehicle occurs as the vehicle speed increases. The extent of the light distribution at each vehicle speed is thereby greater than or equal to the extent at lower vehicle speeds.

12 Claims, 2 Drawing Sheets

(56) References Cited

U.S. PATENT DOCUMENTS

| | | | | |
|---|---|---|---|---|
| 7,561,180 B2* | 7/2009 | Koike | | B60Q 9/004 |
| | | | | 348/148 |
| 11,208,035 B2* | 12/2021 | Erdl | | B60K 35/00 |
| 2003/0146827 A1* | 8/2003 | Koike | | B60Q 1/50 |
| | | | | 340/436 |
| 2003/0147247 A1* | 8/2003 | Koike | | B60Q 1/50 |
| | | | | 362/464 |
| 2008/0117642 A1* | 5/2008 | Moizard | | B60Q 1/085 |
| | | | | 362/466 |
| 2010/0094541 A1* | 4/2010 | Gresser | | B62D 15/0295 |
| | | | | 348/149 |
| 2014/0022068 A1* | 1/2014 | Usami | | G06V 20/584 |
| | | | | 340/436 |
| 2017/0101147 A1* | 4/2017 | Hasegawa | | B60Q 1/38 |
| 2018/0118095 A1* | 5/2018 | Kunii | | B60Q 1/08 |
| 2019/0162381 A1* | 5/2019 | Estes | | F21S 41/43 |
| 2019/0283666 A1* | 9/2019 | Erdl | | B60Q 1/34 |
| 2019/0285239 A1* | 9/2019 | Erdl | | F21S 43/13 |
| 2020/0216062 A1* | 7/2020 | Hakki | | B64C 39/00 |
| 2021/0206312 A1* | 7/2021 | Mochizuki | | H05B 47/115 |

FOREIGN PATENT DOCUMENTS

| | | |
|---|---|---|
| DE | 10 2011 119 923 A1 | 5/2013 |
| DE | 10 2017 000 878 A1 | 11/2017 |
| EP | 1 334 871 A2 | 8/2003 |
| FR | 3 058 106 A1 | 5/2018 |
| WO | WO 2014/181025 A1 | 11/2014 |

OTHER PUBLICATIONS

German-language Written Opinion (PCT/ISA/237) issued in PCT Application No. PCT/EP2019/072825 dated Dec. 2, 2019 (five (5) pages).

German-language Search Report issued in German Application No. 10 2018 216 254.9 dated Aug. 7, 2019 with partial English translation (13 pages).

* cited by examiner

MOTOR VEHICLE HAVING A PROJECTION DEVICE

BACKGROUND AND SUMMARY OF THE INVENTION

The present subject matter relates to a motor vehicle having a projection device to project a light distribution for driver information in front of the motor vehicle.

A motor vehicle having a warning device for the driver is disclosed in document DE 10 2011 078 288 A1, which warning device projects one or more strips of light onto the roadway in the field of view of the driver.

The document DE 10 2017 000 878 A1 discloses an illumination device for a vehicle, wherein the front headlights additionally comprise a laser-based projection module in order to project a virtual lane boundary on the lane.

The document DE 10 2011 119 923 A1 describes an illumination system for air and land vehicles as well as working machines for projecting optical orientation aids. In said document, the adaptation of the distance of a projection in front of a motor vehicle depending on the vehicle speed is disclosed, without the projection itself being changed.

The motor vehicles of the prior art having projection devices are disadvantageous in that the projected light distributions can be used to inform the driver only to a limited extent at higher vehicle speeds.

The object of the present subject matter is therefore to provide a motor vehicle having a projection device that projects a light distribution having improved driver information in front of the motor vehicle.

The motor vehicle according to the present subject matter comprises a projection device in order to project a light distribution for driver information onto the ground in front of the motor vehicle. The light function of the projected light distribution differs here from low-beam light and high-beam light, which are normally generated by one or more front headlights of the motor vehicle. The projection device can be installed at various positions in the motor vehicle depending on the design. The projection device can comprise a single projection module in this case, which is installed, for example, between a pair of front headlights in the front of the motor vehicle. The projection device can also consist of multiple modules, wherein, for example, one module can be integrated in a left front headlight and another module can be integrated in a right front headlight.

The motor vehicle according to the present subject matter is designed in such a way that, during operation of the projection device within a predetermined interval of the vehicle speed in the forward direction of the motor vehicle, an increase of the extent of the light distribution in the longitudinal direction of the motor vehicle (i.e. an increase of the extent of the light distribution along the longitudinal axis of the motor vehicle in the direction away from the motor vehicle) occurs in the case of rising vehicle speed and at the same time the extent at any vehicle speed within the predetermined interval is greater than or equal to the extent at vehicle speeds which are in the predetermined interval and are less than the respective vehicle speed. In other words, the extent of the light distribution increases within the interval with rising vehicle speed in any case, but it can also remain constant in some sections. A decrease of the extent of the light distribution in the interval does not occur with rising vehicle speed, however. Similarly to the increase of the extent of the light distribution, its extent also decreases again in the event of falling vehicle speed.

The motor vehicle according to the present subject matter has the advantage that the projected light distribution remains in the field of view of the driver even at higher speeds and is thus well perceptible by the driver, without the driver having to change his viewing direction.

In one preferred variant, the extent of the light distribution in the longitudinal direction of the motor vehicle increases continuously with increasing vehicle speed, preferably linearly or quadratically or exponentially. It is also possible that the increase of the extent of the light distribution takes place in the form of stages.

In a further preferred embodiment of the motor vehicle according to the present subject matter, the predetermined interval of the vehicle speed begins at a speed value of between 50 km/h to 80 km/h. Alternatively or additionally, the predetermined interval ends at a speed value of between 100 km/h and 150 km/h. Outside this interval, the extent of the light distribution in the longitudinal direction preferably remains constant.

The shortest extent of the light distribution in the longitudinal direction of the motor vehicle is, in a further preferred variant, between 10 m and 15 m. In contrast, the longest extent of the light distribution in the longitudinal direction of the motor vehicle is preferably between 40 m and 50 m.

The above values of the vehicle speed and extent of the light distribution have proven to be practicable, in particular to assist the driver when driving through bottlenecks.

In an example embodiment, the light distribution projected using the projection device is designed in such a way that the vehicle width in the transverse direction of the motor vehicle is conveyed to the driver of the motor vehicle. In this way, the driver is assisted very well when driving through bottlenecks.

In an example, the light distribution projected by the projection device is exclusively located in a region in front of the motor vehicle that is delimited by the vehicle width in the transverse direction of the motor vehicle. The light distribution preferably adjoins the edge of this region at least in sections here. In this way, the vehicle width can be displayed to the driver of the motor vehicle in a simple manner. The light distribution can also extend beyond the vehicle width if necessary, however. For example, it can be dimmed if the vehicle width is exceeded.

In an example embodiment, the light distribution projected by means of the projection device comprises one or more substantially linear bars, which extend in the longitudinal direction of the motor vehicle.

In an example embodiment, one bar in the transverse direction of the motor vehicle has a position which corresponds to the position of the left edge of the motor vehicle in the transverse direction, and another bar is located at a position which corresponds to the position of the right edge of the motor vehicle in the transverse direction. The edge is preferably defined by the outer edge of the left or right exterior mirror, respectively. For example, the inner edges of the two bars or the outer edges of the two bars can be located at the corresponding positions of the left or right edge, respectively, of the motor vehicle in the transverse direction. By means of this variant, the vehicle width can be conveyed to the driver of the motor vehicle particularly simply and intuitively. The bars are preferably narrower than the tire width of the motor vehicle in this case.

In a further example embodiment, the end, located adjacent to the motor vehicle, of the light distribution projected by means of the projection device is not visible from the driver position in the motor vehicle. In the case in which the light distribution comprises the above-described bars, the ends of the bars located adjacent to the motor vehicle are therefore not visible to the driver. By means of this embodiment, it is easily and intuitively conveyed to the driver that the light distribution is associated with his vehicle.

The light distribution generated by means of the projection device can be activated by different events depending on the design. For example, the light distribution can be switched on automatically in relevant situations by intelligent networking with surroundings data acquired via surroundings sensors, or it can be manually activated by the driver. The light distribution can be switched on in addition to the low-beam light and/or high-beam light in this case, however it can also be activated independently of the low-beam light and high-beam light if necessary. In one preferred variant, the light distribution has a sufficient positive contrast to the low-beam light so that the light distribution is visible even with the low-beam light switched on. The light distribution can thus also be used for driver assistance in darkness.

In a further example embodiment, the end of the light distribution which is adjacent to the motor vehicle in the longitudinal direction of the motor vehicle has a distance from the front end of the motor vehicle that is between 3 m and 10 m, preferably between 5 m and 8 m. From such distances, in general the end of the light distribution located adjacent to the motor vehicle is no longer visible to the driver of the motor vehicle.

In an example embodiment, the projection device is designed in such a way that it projects white light, preferably exclusively, onto the ground. Legal requirements are taken into consideration in this way. To achieve a particularly bright projection, in one preferred variant the projection device uses a laser light source, which is a constituent part of a laser scanner system, for example.

The projection device of the motor vehicle according to the present subject matter can be based on technologies known per se. In particular, the projection device can comprise a digital mirror device (DMD) and/or a laser scanner system and/or an LCD projector.

In a further preferred variant, the motor vehicle according to the present subject matter is designed in such a way that the projection device changes the light distribution when a risk of collision with an object is detected by a surroundings sensor system of the motor vehicle. For example, flashing of the light distribution and/or a color change of the light distribution, for example from white to red, can be effectuated in the case of such an event. Very effective warning of the driver against collisions is achieved by means of this embodiment.

An example embodiment of the present subject matter is described in detail hereinafter based on the appended figures.

DETAILED DESCRIPTION OF THE DRAWINGS

Figure 1:
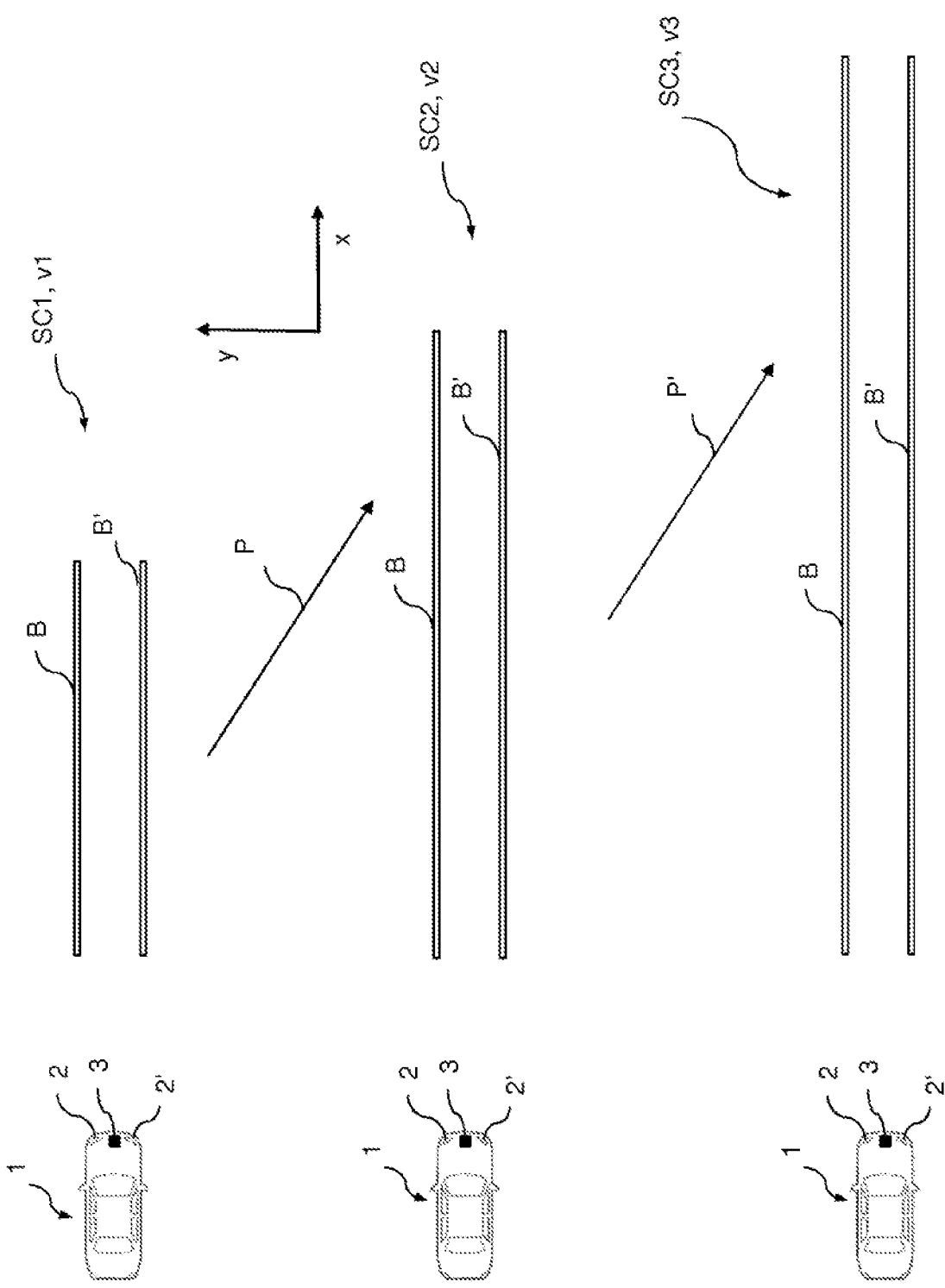
FIG. 1 shows a schematic illustration of three scenarios, based on which the generation of a light distribution by means of one embodiment of a motor vehicle according to the present subject matter is explained by way of example.

FIG. 1 shows a schematic top view of three scenarios SC1, SC2 and SC3, which respectively depict the generation of a light distribution by way of a variant of the motor vehicle 1 according to the present subject matter. A coordinate system having the perpendicular axes x and y is depicted in FIG. 1 here. In this respect, the axis x represents the longitudinal direction of the motor vehicle 1 and extends in its direction of travel. In contrast, the axis y represents the transverse direction of the motor vehicle, i.e. its width direction.

The motor vehicle 1 comprises the two headlights 2 and 2' in the front, which are used to generate low-beam light and high-beam light. In addition, the motor vehicle includes in the front region a projection module 3, which is indicated purely schematically by a black square. This projection module is used to project two linear, parallel bars B and B' in front of the motor vehicle 1 while the motor vehicle is travelling. The two bars B and B' represent an embodiment of a light distribution according to the present subject matter. The bars are a white-light distribution and have a well recognizable positive contrast to the low-beam light generated by the headlights 2 and 2', so that the bars are visible even when the low-beam light is switched on.

The projection module 3 can be designed in various ways. For example, it can be a DMD device, a laser scanner, an LCD display, and the like. The projection module is preferably distributed onto multiple units. In the embodiment described here, one submodule is provided in the headlight 2 for generating the bar B and another submodule is provided in the headlight 2' for generating the bar B'.

One essential feature of the present subject matter is that the extent of the bars B and B' in the longitudinal direction of the motor vehicle 1 is dependent on the speed of the motor vehicle, as explained in the following based on the scenarios SC1, SC2 and SC3 shown in FIG. 1. In the scenario SC1, the motor vehicle 1 moves at a first speed v1 of approximately 80 km/h in the forward direction. At this speed, the bars B and B' have in each case a length in the longitudinal direction x of approximately 15 m. The distance of the bars in the transverse direction y is selected here in such a way that it corresponds to the width of the motor vehicle 1. That is to say, the bar B is located at the height of the outer edge of the left exterior mirror of the motor vehicle 1, whereas the bar B' is arranged at the height of the outer edge of the right exterior mirror of the motor vehicle 1. In this way, the width of his vehicle is conveyed to the driver of the motor vehicle 1, so that he can recognize easily and intuitively when driving through bottlenecks whether and/or how he can pass the bottleneck without collision. A guide light for assisting the driver of the motor vehicle 1 is thus provided by the bars B and B'.

In contrast to the scenario SC1, in the scenario SC2 the motor vehicle 1 travels at a higher speed v2, which is approximately 90 km/h, for example. The increase of the speed is indicated by the arrow P in FIG. 1. There is now the problem that, due to the faster travel of the motor vehicle, the bars B and B' are no longer long enough for the driver of the motor vehicle to be able to recognize with sufficient advance notice whether and/or how he can pass a bottleneck without collision. Accordingly, in the embodiment described here, the length of the bar B and/or B' is increased depending on the speed, i.e. the bars become longer the greater the speed is. At a speed v2 of approximately 90 km/h, the bars lengthen, for example to a length of approximately 25 m.

In the scenario SC3 of FIG. 1, the motor vehicle 1 has been accelerated to a still higher speed v3, which is indicated by the arrow P'. This speed v3 is, for example, approximately 120 km/h. As a consequence, the two bars B and B' are lengthened still further, so that they have a length of approximately 40 m, for example. The further lengthening of the bars in turn ensures that the width of his vehicle is conveyed to the driver in a timely manner even at higher speeds, so that he can recognize collision risks early. Independently of the length of the bars, their distance in the transverse direction y remains constant for all vehicle speeds in order to indicate the vehicle width.

Furthermore, a minimum length of the bars exists, wherein the bars are firstly depicted in the minimum length at low speeds and only increase in length upon exceeding a lower speed value. In the same way, a maximum length of the bars exists, wherein the bars do not become longer than this maximum length as soon as an upper speed value is exceeded.

It can furthermore be seen in the scenarios shown in FIG. 1 that the bars B and B' always begin at the same position at a fixed distance in front of the motor vehicle independently of the speed of the motor vehicle. The distance is selected here in such a way that, from the driver position of the motor vehicle, the end of the bars located adjacent to its front is not visible, but rather is concealed by the engine hood. In this way, the impression results for the driver of the motor vehicle that the bars begin directly at the motor vehicle, so that he can associate the bars with his vehicle. The spacing of the bars from the front of the motor vehicle furthermore has the advantage that the projection of the bars by the projection module 3 is simplified.

Figure 2:
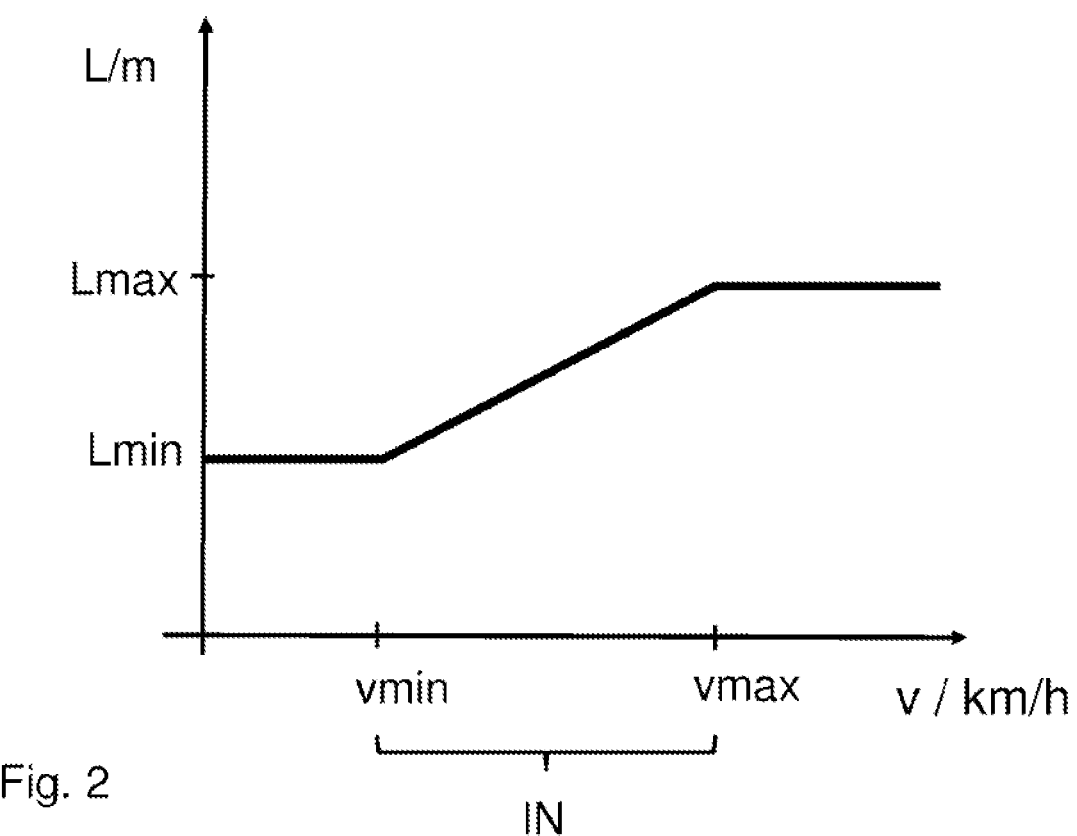
FIG. 2 shows a diagram which depicts the dependence of the extent of the light distribution shown in FIG. 1 on the speed of the motor vehicle by way of example.

FIG. 2 shows by way of example a curve of how the length of the bars B and B' can change as a function of the speed of the motor vehicle during forward travel. In FIG. 2, the speed v of the motor vehicle is indicated along the abscissa and the respective length L of the bars B and B' is indicated along the ordinate. A minimum speed value vmin and a highest speed value vmax and also a minimum length Lmin and a maximum length Lmax of the bars B and B' exist here. The speeds between these two values represent a speed interval IN, within which the length of the bars B and B' changes as a function of the speed. As can be seen in FIG. 2, the length of the bars always remains at the value Lmin at speeds below the speed value vmin. The speed value vmin is preferably between 50 km/h and 80 km/h, whereas the length Lmin is preferably between 10 m and 15 m. After vmin is exceeded, the length of the bars increases linearly until the bars have the maximum length Lmax at the speed value vmax. The speed value vmax is preferably between 100 km/h and 150 km/h, whereas the length Lmax is preferably between 40 m and 50 m. If the speed of the motor vehicle is increased above vmax, no further lengthening of the bars occurs, i.e. the bars maintain their length Lmax.

The linear curve of the lengthening of the bars as a function of the speed that is shown in FIG. 2 is solely by way of example and the bars can also lengthen based on a different dependency, for example based on a curve in the form of stages. In addition, the speed values and/or bar lengths mentioned in connection with FIG. 1 and FIG. 2 are only by way of example and can also be selected differently depending on the design. Rather, it is essential to the present subject matter that the length of the bars increases in a specific speed range in order to ensure in this way that the bars remain in the field of view of the driver and assist him when driving through bottlenecks.

The embodiments of the present subject matter described above have an array of advantages. In particular, by way of the bars projected onto the ground, the driver of a motor vehicle can better estimate in difficult traffic situations, for example bottlenecks on freeways, highways and in the city, whether and how well his vehicle fits through the corresponding bottleneck. Such bottlenecks can be caused by construction sites or other conditions. In addition, it is indicated easily and intuitively to the driver whether he can pass without collision during an overtaking process. Due to the direct projection of the bars onto the road, the driver is not distracted from the traffic situation and remains focused in his driving task on the relevant route sections in front of the vehicle. It is furthermore ensured by the direct projection that the vehicle width is displayed absolutely and independently of the eye position of the driver. Due to the lengthening of the bars with increasing speed, the bars follow the viewpoint of the driver and give the relevant items of information in the region on which the driver is focused at a corresponding speed. To confirm the association with the driver's own vehicle, the projection of the bars begins in front of the vehicle at a point such that the beginning of the bars is not visible to the driver.

LIST OF REFERENCE SIGNS

1 motor vehicle
2, 2' front headlights
3 projection device
B, B' projected bars
P, P' arrows
SC1, SC2, SC3 scenarios
v, v1, v2, v3 speeds
vmin minimum speed
vmax highest speed
IN speed interval
L length of the bars
Lmin minimum length of the bars
Lmax maximum length of the bars

What is claimed is:

1. A motor vehicle, comprising:
a projection device to project a light distribution for driver information in the longitudinal direction of the motor vehicle onto the ground in front of the motor vehicle, wherein
the light function of the projected light distribution differs from a low-beam light and a high-beam light,
during operation of the projection device within a predetermined interval of the vehicle speed in the forward direction of the motor vehicle, an increase of the extent of the light distribution occurs in the longitudinal direction of the motor vehicle with increasing vehicle speed,
the extent of the light distribution at each vehicle speed is greater than or equal to the extent of the light distribution at lower vehicle speeds, and
the end of the light distribution that is located adjacent to the motor vehicle in the longitudinal direction of the motor vehicle is not visible from the driver position in the motor vehicle.

2. The motor vehicle according to claim 1, wherein the extent of the light distribution in the longitudinal direction of the motor vehicle increases continuously, linearly, quadratically, exponentially, and/or in the form of stages, with increasing vehicle speed.

3. The motor vehicle according to claim 1, wherein the predetermined interval of the vehicle speed:
begins at a speed value between 50 km/h to 80 km/h, and/or
ends at a speed value between 100 km/h and 150 km/h.

4. The motor vehicle according to claim 1, wherein
the shortest extent of the light distribution in the longitudinal direction of the motor vehicle is between 10 m and 15 m, and/or
the longest extent of the light distribution in the longitudinal direction of the motor vehicle is between 40 m and 50 m.

5. The motor vehicle according to claim 1, wherein
the light distribution conveys the vehicle width in the transverse direction of the motor vehicle to the driver of the motor vehicle.

6. The motor vehicle according to claim 1, wherein
the light distribution is exclusively in a region in front of the motor vehicle that is delimited by the vehicle width in the transverse direction of the motor vehicle, and
the light distribution adjoins the edge of this region at least in sections.

7. A motor vehicle, comprising:
a projection device to project a light distribution for driver information in the longitudinal direction of the motor vehicle onto the ground in front of the motor vehicle, wherein
the light function of the projected light distribution differs from a low-beam light and a high-beam light,
during operation of the projection device within a redetermined interval of the vehicle speed in the forward direction of the motor vehicle, an increase of the extent of the light distribution occurs in the longitudinal direction of the motor vehicle with increasing vehicle speed,
the extent of the light distribution at each vehicle speed is greater than or equal to the extent of the light distribution at lower vehicle speeds,
the light distribution comprises one or more essentially linear bars, which extend in the longitudinal direction of the motor vehicle,
one bar of the one or more essentially linear bars in the transverse direction of the motor vehicle has a position that corresponds to the position of the left edge of the motor vehicle in the transverse direction,
another bar of the one or more essentially linear bars has a position that corresponds to the position of the right edge of the motor vehicle in the transverse direction, and
the one bar and the other bar are narrower than the tire width of the motor vehicle.

8. A motor vehicle, comprising:
a projection device to project a light distribution for driver information in the longitudinal direction of the motor vehicle onto the ground in front of the motor vehicle, wherein
the light function of the projected light distribution differs from a low-beam light and a high-beam light,
during operation of the projection device within a predetermined interval of the vehicle speed in the forward direction of the motor vehicle, an increase of the extent of the light distribution occurs in the longitudinal direction of the motor vehicle with increasing vehicle speed,
the extent of the light distribution at each vehicle speed is greater than or equal to the extent of the light distribution at lower vehicle speeds, and
the light distribution has a brightness such that the light distribution is visible even with switched-on low-beam light of the motor vehicle.

9. The motor vehicle according to claim 1, wherein
the end of the light distribution that is located adjacent to the motor vehicle in the longitudinal direction of the motor vehicle has a distance from the front end of the motor vehicle that is between 3 m and 10 m or between 5 m and 8 m.

10. The motor vehicle according to claim 1, wherein
the projection device is configured to project white light onto the ground.

11. The motor vehicle according to claim 1, wherein
the projection device comprises at least one of a digital mirror device (DMD), a laser scanner, or an LCD projector.

12. The motor vehicle according to claim 1, wherein
the projection device is configured to change the light distribution when a risk of collision with an object is detected by a surroundings sensor system of the motor vehicle.

* * * * *